(12) United States Patent
Qian et al.

(10) Patent No.: US 9,574,946 B2
(45) Date of Patent: Feb. 21, 2017

(54) SPATIOTEMPORALLY RESOLVED FAR-FIELD PULSE CONTRAST MEASURING METHOD AND DEVICE

(71) Applicant: SHANGHAI JIAO TONG UNIVERSITY, Shanghai (CN)

(72) Inventors: Liejia Qian, Shanghai (CN); Jingui Ma, Shanghai (CN); Peng Yuan, Shanghai (CN); Jing Wang, Shanghai (CN); Yongzhi Wang, Shanhai (CN); Guoqiang Xie, Shanghai (CN); Dianyuan Fan, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 234 days.

(21) Appl. No.: 14/530,818

(22) Filed: Nov. 2, 2014

(65) Prior Publication Data

US 2016/0033324 A1 Feb. 4, 2016

(30) Foreign Application Priority Data

Jul. 30, 2014 (CN) .......................... 2014 1 0369996

(51) Int. Cl.
*G06T 3/00* (2006.01)
*G01J 11/00* (2006.01)
*G06T 7/00* (2006.01)
*G06T 5/00* (2006.01)

(52) U.S. Cl.
CPC .............. *G01J 11/00* (2013.01); *G06T 3/0087* (2013.01); *G06T 5/002* (2013.01); *G06T 7/0071* (2013.01); *G06T 7/0097* (2013.01)

(58) Field of Classification Search
CPC ......... G01J 11/00; G06T 3/0087; G06T 5/002; G06T 7/0071; G06T 7/0097; A61M 2005/14292
See application file for complete search history.

(56) References Cited

U.S. PATENT DOCUMENTS

| | | | | |
|---|---|---|---|---|
| 5,682,262 A | * | 10/1997 | Wefers | .................... H01S 3/005 349/1 |
| 2010/0135344 A1 | * | 6/2010 | Barnes | .................. G02F 1/3501 372/22 |

* cited by examiner

*Primary Examiner* — Francis M Legasse, Jr.

(57) ABSTRACT

A spatiotemporally resolved far-field pulse contrast measuring device includes a plano-convex cylindrical lens, a nonlinear correlation crystal, a plano-convex imaging lens and a signal-receiving system. The signal-receiving system includes a fiber array, a photomultiplier and a digital oscilloscope. A measuring method of the device includes steps of: focusing an under-test beam in x dimension to make a focus of the under-test beam fall onto a front surface of the nonlinear correlation crystal; making a spatial correlation and a temporal correlation respectively in two transverse spatial dimensions (x-y) of the nonlinear correlation crystal by the far-field under-test beam and a sampling beam; generating a two-dimensional correlating signal by the spatiotemporal correlation; imaging the two-dimensional correlating signal by an imaging system onto a detection surface of a receiver system; and measuring the x-dimensional and y-dimensional intensity distributions of the correlating signal highly dynamically by the receiver system.

7 Claims, 3 Drawing Sheets

SPATIOTEMPORALLY RESOLVED FAR-FIELD PULSE CONTRAST MEASURING METHOD AND DEVICE

CROSS REFERENCE OF RELATED APPLICATION

The present invention claims priority under 35 U.S.C. 119(a-d) to CN 201410369996.3, filed Jul. 30, 2014.

BACKGROUND OF THE PRESENT INVENTION

Field of Invention

The present invention relates to a field of laser technology, and more particularly to a spatiotemporally resolved far-field pulse contrast measuring method and a device thereof, and an online identification method for origins of spatiotemporal noise.

Description of Related Arts

Pulse contrast is an important parameter of ultrahigh-peak-power lasers, defined as the intensity ratio of the pulse peak to its background noise. If the contrast of a laser pulse is not high enough, the background noise will disturb the interaction between the main pulse and the experimental target. Therefore, to control and measure the pulse contrast is advantageous to the smooth implement of laser-matter interacting experiments.

The measurement of the pulse contrast is mainly based on the optical cross-correlation technology. An under-test pulse and a sampling pulse which has a higher contrast than the under-test pulse make a cross-correlation in a nonlinear crystal, in such a manner that the contrast of the under-test pulse is obtained by detecting the relationship between the correlating signal intensity and the time delay of the two pulses. The time-scanning third-order cross-correlator has been commercialized (Sequoia, Amplitude Technologies, France), wherein a sampling pulse generated by a frequency multiplier makes a sum-frequency-generation-based interaction with an under-test pulse in a crystal, generating a third-harmonic signal detected by a photomultiplier. To measure the pulse contrast of the laser systems with a low repetitive rate, the single-shot cross-correlator has also been developed, which mainly depends on the non-collinear interaction between the under-test pulse and the sampling pulse for converting the temporal intensity information of the under-test pulse into the spatial intensity information of the correlating signal.

The conventionally available scanning or single-shot cross-correlation technologies are merely performed in the temporal domain and commonly in the near-field. However, the physical experiments are generally made at the focus (i.e., the far-field) of the driving laser. The latest studies demonstrated that some laser noises would exhibit a spatiotemporal-coupling characterization in a far-field, resulting in a space-dependent pulse contrast in essence. In this condition, the measurement for the pulse contrast must be performed in both the temporal domain and the spatial domain in the far-field of the laser beam. Unfortunately, the conventional temporal cross-correlation technologies have no such capability.

SUMMARY OF THE PRESENT INVENTION

Accordingly, in order to accomplish above objects, the present invention provides a spatiotemporally resolved far-field pulse contrast measuring method and a device thereof.

The present invention achieves a spatiotemporal cross-correlator by extending a cross-correlation from temporal domain to spatiotemporal domain, which enables a two-dimensional measurement of spatiotemporal noise as well as an identification of origins of the spatiotemporal noise. The present invention guides a design of a high-contrast high-intensity laser system, and paves the way for researching the contrast directly at a far-field.

The present invention works as follows: firstly, an under-test beam is focused in x dimension onto a front surface of a nonlinear crystal by a focusing system; secondly, a far-field under-test beam and a sampling beam make a spatial correlation and a temporal correlation respectively in two transverse spatial dimensions (x-y) of the nonlinear crystal, and generate a two-dimensional correlating signal, whose x-dimensional and y-dimensional intensity distributions respectively correspond to spatial and temporal pulse contrast information of the under-test beam; thirdly, the correlating signal is two-dimensionally imaged onto a detection surface of a receiver system; and finally, the receiver system highly dynamically measures the x-dimensional and y-dimensional intensity distributions of the correlating signal and obtains a far-field contrast of the under-test pulse.

The present invention adopts following technical solutions.

A spatiotemporally resolved far-field pulse contrast measuring method comprises steps of:

(1) focusing an under-test beam in x dimension to make a focus of the under-test beam fall onto a front surface of a nonlinear correlation crystal;

(2) making a spatial correlation and a temporal correlation respectively in two transverse spatial dimensions (x-y) of the nonlinear correlation crystal by the far-field under-test beam and a sampling beam, so as to generate a two-dimensional correlating signal;

(3) imaging the two-dimensional correlating signal onto a detection surface of a receiver system; and (4) detecting the two-dimensional correlating signal by the receiver system at a high sensitivity, and obtaining a spatiotemporal distribution of the under-test pulse contrast.

The x dimension is a spatial dimension where noise has a spatiotemporal-coupling characterization. If the noise has the spatiotemporal-coupling characterization in two spatial dimensions, then the x dimension is one of the two spatial dimensions. Herein, to measure a far-field distribution of the noise in the other dimension, the under-test beam must be focused in the y dimension.

The sampling beam on the surface of the nonlinear correlation crystal is shaped as a large spot or a focused spot. When the sampling beam is shaped as a focused spot, the sampling beam has a same focusing direction as the under-test beam.

The under-test beam and the sampling beam make a non-collinear cross-correlation in the y dimension to realize a single-shot temporal measurement, and make the spatial correlation in the x dimension. According to the sampling beam shaped as a large spot or a focused spot, the spatial correlation works in a single-shot mode or a scanning mode.

The receiver system has a high two-dimensional spatial-resolved capability and also has high detection sensitivity.

A single-shot far-field pulse-contrast measuring device of the method comprises: a plano-convex cylindrical lens, a correlation crystal, a plano-convex imaging lens and a signal-receiving system. The signal-receiving system comprises a fiber array, a photomultiplier and a digital oscilloscope. The fiber array comprises N fiber-channels, attenuators on each fiber channel and a fiber bundle. The length of each fiber channel between the fiber array and the fiber bundle increases successively, wherein an incremental length is L meters. The correlation crystal is located both at a focal plane of the plano-convex cylindrical lens and an object plane of the plano-convex imaging lens. The fiber array is located at an image plane of the plano-convex imaging lens. A line array of the N fiber-channels is parallel with a focal line of the plano-convex cylindrical lens. An output end of the photomultiplier is connected with an input end of the digital oscilloscope.

The fibers are communication fibers or ultraviolet fibers. The fiber array is fixed on a holder which is translational in the x dimension. The incremental length L of the fiber channels is 1-2 meters and the number of the fiber-channels N is 50-200.

The fiber array converts the received y-dimensional correlating signal into a serial temporal pulse sequence which is received and analyzed by the photomultiplier and the oscilloscope.

An online identification method for origins of the spatiotemporal noise of the device comprises steps of: when the fiber array is located at a certain spatial position, observing images displayed by the digital oscilloscope; placing a lens tissue in front of a specific optical surface to interfere a laser beam on the surface, and observing a signal peak which is typically enhanced on the digital oscilloscope, wherein the signal peak is correspondently induced by imperfect optical surface.

Because of a single-shot measurement of the device in the temporal domain, the digital oscilloscope shows simultaneously a group of data when the fiber array is located at a position x in space, so that the device is capable of online identifying the origins of the spatiotemporal noise. The spatiotemporal noise generally stems from the imperfect optical element surface of a pulse stretcher and a compressor in a laser amplifier system. Typically, the different optical elements generate spatiotemporal noise with different spatiotemporal slopes which are displayed at different time coordinates on the digital oscilloscope. During the identification process, the fiber array is fixed at a position x and a lot of signal peaks are normally displayed on the digital oscilloscope; the lens tissue is provided to interfere the laser beam on the optical element surface, which is equivalent to enhancing the imperfection of the optical surface; and then, it is observed that some signal peak displayed on the digital oscilloscope is suddenly enhanced, so that the enhanced signal peak is determined to stem from the optical element surface.

The present invention is capable of measuring the spatiotemporal noise and as well as identifying origins of the spatiotemporal noise, and is suitable for measuring and studying the far-field pulse contrast of high-peak-power lasers. The present invention shows incomparable advantages in the construction and optimization process of a high-contrast laser system. In addition, the present invention is promising for applications in fields of detection of optical subsurface damage, ultrafast nonlinear optics, spatiotemporally resolved spectroscopy and so on.

These and other objectives, features, and advantages of the present invention will become apparent from the following detailed description, the accompanying drawings, and the appended claims.

Figure 1:
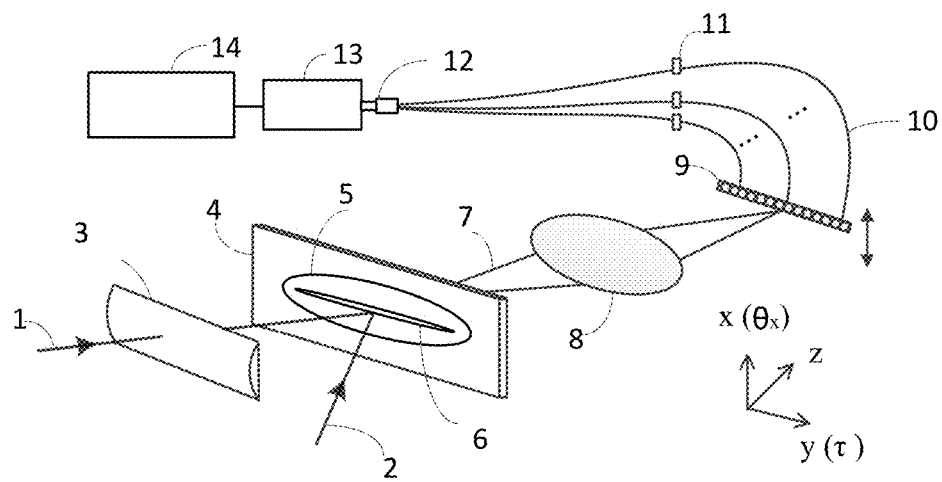
FIG. 1 is a structural diagram of a spatiotemporally resolved far-field pulse contrast measuring device according to a preferred embodiment of the present invention.

In the drawings, 1: under-test beam; 2: sampling beam; 3: plano-convex lens; 4: nonlinear correlation crystal; 5: sampling spot at a surface of the crystal; 6: under-test spot at the surface of the crystal; 7: correlating signal; 8: plano-convex imaging lens; 9: fiber array; 10: fiber channels; 11: attenuators; 12: fiber bundle; 13: photomultiplier; 14: digital oscilloscope; 15: Ti:sapphire regenerative amplifier; 16: optical parametric amplifier; 17: cross-polarized-wave generating device; 18: pulse stretcher (see details in FIG. 3); 19: pulse compressor (see details in FIG. 4); 20: spatiotemporally resolved far-field pulse contrast measuring device (see details in FIG. 1); 21: stretcher grating; 22: concave mirror; 23: convex mirror; 24: stretcher vertical roof mirror; 25~28: first to fourth beam passing the concave mirror; 29: compressor grating; 30: compressor horizontal roof mirror; 31: compressor vertical roof mirror.

DETAILED DESCRIPTION OF THE PREFERRED EMBODIMENT

The present invention is further explained in detail with the accompanying drawings and preferred embodiments.

Referring to FIG. 1 of the drawings, according to a preferred embodiment of the present invention, a spatiotemporally resolved far-field pulse contrast measuring device is illustrated, wherein the device comprises: a plano-convex cylindrical lens 3, a nonlinear correlation crystal 4, a plano-convex imaging lens 8 and a signal-receiving system. The signal-receiving system comprises a fiber array 9, a photomultiplier 13 and a digital oscillator 14 in sequence. The fiber array comprises N fiber channels 10, attenuators 11 on each fiber channel 10 and a fiber bundle 12. A length of each fiber channel 10 between the fiber array 9 and the fiber bundle 12 increases successively, wherein an incremental length is L meters. The nonlinear correlation crystal 4 is located both at a focal plane of the plano-convex cylindrical lens 3 and at an object plane of the plano-convex circular lens 8. The fiber array 9 is located at an image plane of the plano-convex imaging lens 8. A line array of the fiber array 9 is parallel with a focal line of the plano-convex cylindrical lens 3. An output end of the photomultiplier 13 is connected with an input end of the digital oscilloscope 14.

A laser generated by a light source of the preferred embodiment is divided into two portions, wherein one portion is used as a sampling beam 2 after being nonlinearly filtered; and the other portion, used as an under-test beam 1, is focused in an x dimension by the plano-convex cylindrical lens 3 with a focal length of F and has a focal line located at a surface of the nonlinear crystal 4, which is simulated as an experimental target location (i.e. a far-field location). The focal length F of the plano-convex cylindrical lens 3 is generally 20 to 100 cm. The nonlinear crystal 4 is a common BBO or LiNbO$_3$ crystal. The focal line of the under-test beam 1 and the sampling spot 5 of the sampling beam 2 make a sum-frequency-generation-based interaction in the nonlinear crystal 4. Between the two beams exists a certain non-collinear angle in a y dimension for realizing a single-shot measurement in the temporal domain. A size of a single-shot temporal window is determined by the non-collinear angle. Take a 1-cm-wide BBO crystal for an example, the single-shot temporal window is 36 ps when the non-collinear angle in the crystal is 38.8°. Generally speaking, the single-shot temporal window is between 40 and 100 ps. In the x dimension, the sampling beam 2 interacts with the under-test beam 1 at different spatial locations in the far-field, forming a spatial cross-correlation. Under the large sampling spot 5, the spatial cross-correlation works in a single-shot mode, wherein a diameter D of the sampling spot 5 determines a single-shot spatial angle window of D/F; when the sampling beam 5 is also focused in the x dimension, the spatial cross-correlation works in a scanning mode. A focal line of the sampling beam 5 translates in the x dimension to detect an under-test pulse (the under-test beam 1) at different locations, wherein a scanning scope S of the sampling beam 2 determines the spatial angle window of S/F. A focusing system and a spatiotemporal cross-correlation system enable the device to work in the far-field of the laser beam and to have a spatiotemporally resolved capability, making up for the deficiency of existing technologies.

The spatiotemporal cross-correlation generates a sum-frequency correlating signal 7, whose intensity distributions in the x and y dimensions respectively represent contrast information of the under-test beam 1 in spatial ($\theta_x$) and temporal ($\tau$) domains. Thus the correlating signal 7 requires an exact two-dimensional imaging. In the preferred embodiment of the present invention, the device further comprises an imaging system built by a single lens (the plano-convex lens 8) with an imaging proportion of 1:1. The imaging system and the imaging proportion can be flexibly selected according to practical conditions.

A detection system of the device is required to have a two-dimensional spatial resolving capability to detect the correlating signal 7 distributed in the two spatial dimensions. The device further comprises the detection system comprising the fiber array 9, the fiber channels 10, the attenuators 11, the fiber bundle 12, the photomultiplier 13 and the digital oscilloscope 14 arranged along the y dimension. The fiber array 9 is located at an image plane of the imaging system to receive the correlating signal 7. The number of the fiber channels 10 is N. According to a signal wavelength, the fibers adopt telecommunication fibers or ultraviolet fibers. The fiber array 9 translates in the x dimension to detect the correlating signal 7 at different x locations. At a certain x location, the fiber array 9 receives the correlating signal 7 in the y dimension and samples the correlating signal 7 by N points. The length of each fiber channels 10 increases successively from side to side of the fiber array 9, wherein the incremental length is L meters. After passing through the fiber array 9, signals outputted from the fiber bundle 12 change into a train of signals with a temporal interval of Ln/c, wherein n is a refractive index of the fibers and c is the light speed in vacuum. The serial signals are received by the photomultiplier 13. Because the temporal interval of the serial signals is required to be larger than a response time of the photomultiplier 13, the incremental length L is generally 1 to 2 m. The number N of the fiber channels 10, which determines spatial resolution, is generally 50 to 200. To ensure the signal intensity in each fiber channel 10 is within the measuring range of the photomultiplier 13, a certain number of the attenuators 11 are inserted into the corresponding fiber channels 10 with strong signals. Output signals of the photomultiplier 13 are analyzed by the digital oscilloscope 14. At a certain x location, N pieces of data are obtained on the digital oscilloscope 14. After recording the data of the oscilloscope 14 at M different x locations, N*M pieces of data are obtained. By analyzing the N*M pieces of data combining with attenuation values of the corresponding fiber channels 10, the spatiotemporal contrast information of the under-test pulse 1 is obtained.

In the preferred embodiment, the under-test pulse 1 is one-dimensionally focused by the plano-convex cylindrical lens 3 (at a focal length of 50 cm), forming an under-test spot 6 [100-μm (x)*15-mm (y)] at the surface of the nonlinear crystal 4. The sampling beam 2 has a large spot 5 [4-mm (x)*15-mm (y)] at the surface of the nonlinear crystal 4. The nonlinear crystal 4 is a 3-mm-thick BBO crystal cut at 78°. The under-test spot 6 and the sampling spot 5 make a non-collinear interaction (with a non-collinear angle of 38.8°) in the y dimension to translate the temporal intensity distribution of the under-test beam 1 into the y-dimensional spatial intensity distribution of the correlating signal 7, supporting a single-shot temporal window of 36 ps/cm. At the same time, the two beams make a spatial cross-correlation in the x dimension to translate the far-field spatial intensity distribution of the under-test pulse 1 into the x-dimensional spatial intensity distribution of the correlating signal 7. The two-dimensional correlating signal 7 generated by the spatiotemporal cross-correlation is imaged onto an end face of the fiber array 9 by the plano-convex lens 8 (at a focal length of 20 cm) with imaging proportion of 1:1. The fiber array 9 comprises 100 ultraviolet fiber channels 10 (Ceram Optec, core diameter of 105 μm), wherein the length of the fiber channels 10 increases successively from 3 to 102 m and the incremental length between two neighbor channels is 1 m. The fiber array 9 is fixed on an x-dimension translation stage. The attenuators 11 are provided on each fiber channel 10 and the attenuation values are adjusted according to signal value in each channel. The output signals from the fiber bundle 12 is a temporal pulse sequence which is received by the photomultiplier 13 (H6780-04, Hamamatsu). The output signals from the photomultiplier 13 are analyzed by the digital oscilloscope 14. For above design parameters, a spatial and a temporal resolution of the device are respectively 0.2 mrad and 0.5 ps.

Figure 2:
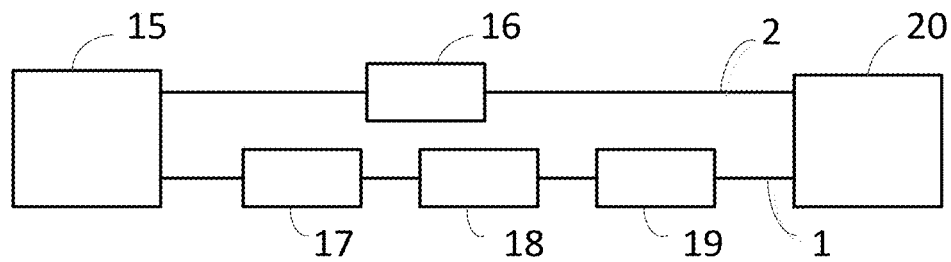
FIG. 2 is a block diagram of an optical path according to the preferred embodiment of the present invention.
Figure 3:
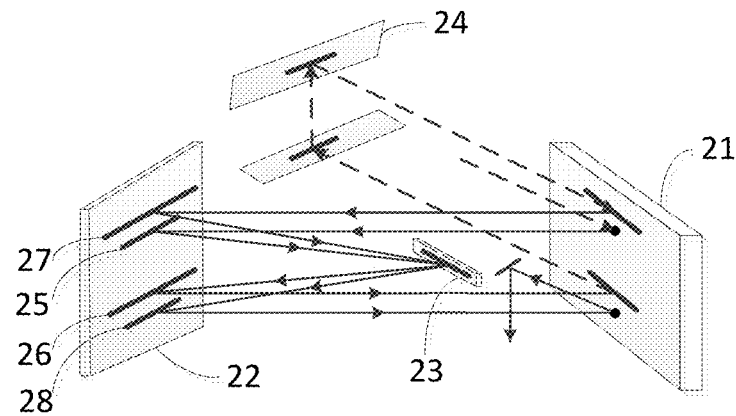
FIG. 3 is a structural diagram of a pulse stretcher according to the preferred embodiment of the present invention.
Figure 4:
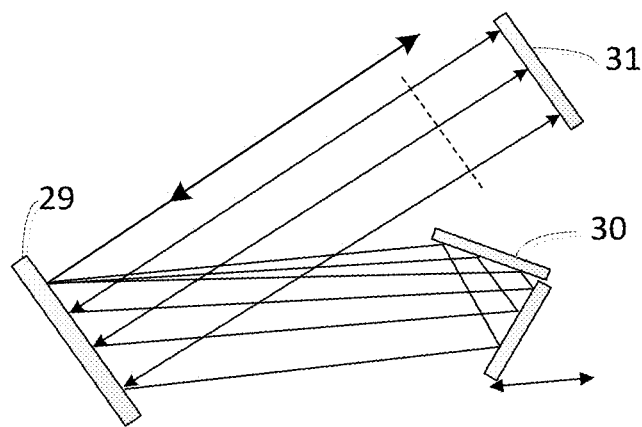
FIG. 4 is a structural diagram of a pulse compressor according to the preferred embodiment of the present invention.

In the preferred embodiment of the present invention, the spatiotemporal noise generated by a practical stretcher-compressor system is detected by the device and an optical path thereof is shown in FIG. 2. The light source at a central wavelength of 800 nm is a Ti:sapphire regenerative amplifier 15 with a total energy of 3 mJ and a repetition frequency of 1 kHz, wherein 1 mJ energy pumps an optical parametric amplifier 16 [see details in Scientific Reports, Vol. 4, pp. 3818 (2014)] to generate the sampling beam 2 (about 200 μJ); and remaining 2 mJ energy, after successively passing through a cross-polarized-wave generating device 17 [see details in Scientific Reports, Vol. 4, pp. 3818 (2014)] to filter noise carried by the laser, a pulse stretcher 18 and a pulse compressor 19, is used as the under-test beam 1. The pulse stretcher 18 is an Öffner stretcher whose structural diagram is shown in FIG. 3, comprising a grating 21 (1480 lines/mm), a concave mirror 22 (a radius of curvature is 2 m), a convex mirror 23 (a radius of curvature is 1 m) and a vertical roof mirror 24. Four beams 25-28, the first to fourth beam passing the concave mirror 22, fall on the concave mirror 22. The pulse compressor 19 comprises a grating 29 (1480 lines/mm), a horizontal roof mirror 30 and a vertical roof mirror 31. All mirror surfaces of the pulse stretcher 18 and the pulse compressor 19 are gold-coated surfaces. According to the theoretical studies [J. Opt. Soc. Am. B, Vol. 29, pp. 1125-1135 (2012)], a surface roughness of above optical elements will generate spatiotemporal noise in the far-field of a compressed pulse.

An application of the preferred embodiment is introduced as follows.

Figure 5:
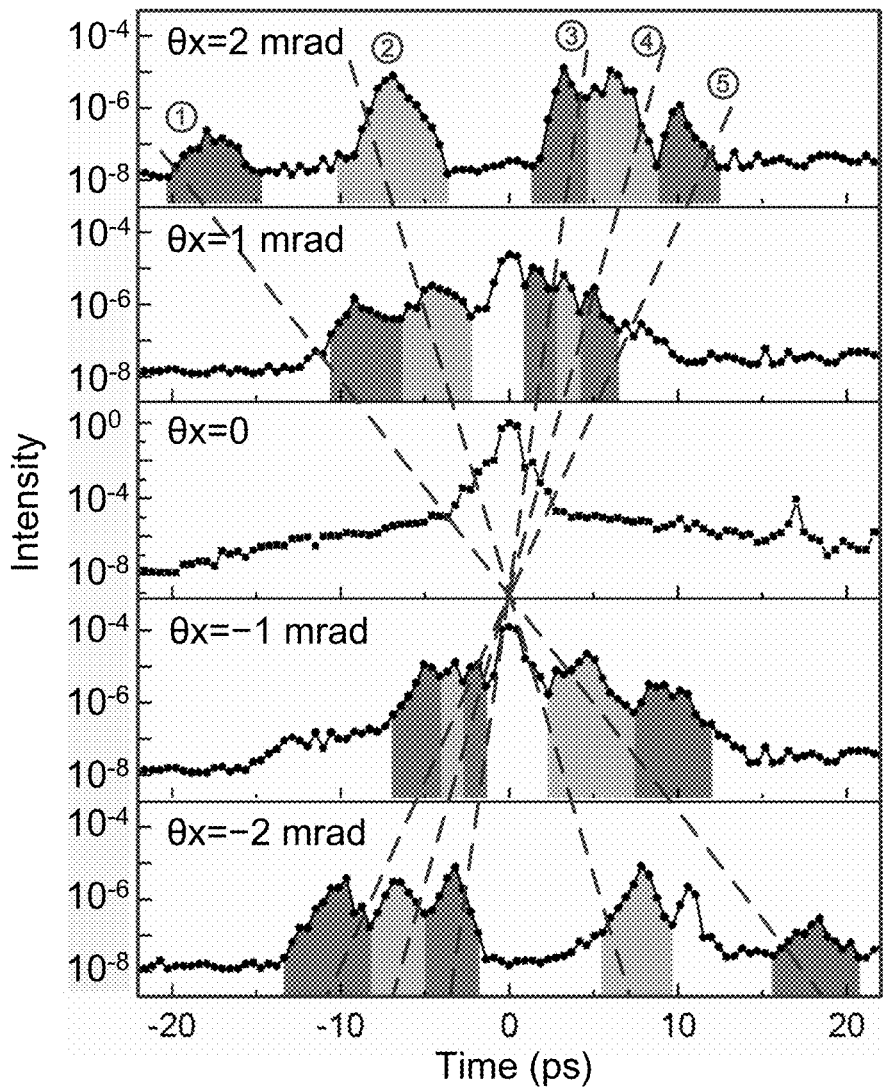
FIG. 5 shows measured pulse contrast correlation traces according to the preferred embodiment of the present invention.

The spatiotemporally resolved far-field pulse contrast measuring device of the present invention is used to measure the spatiotemporal noise generated by the pulse stretcher 18 and the pulse compressor 19. As showed in FIG. 5, the measuring device measures the contrast at a far-field axis ($\theta_x$=0) and other four spatial positions ($\theta_x$=±1, ±2 mrad). According to different spatiotemporal slopes, the spatiotemporal noise is divided into 5 groups, respectively numbered from ① to ⑤. According to a relationship of $\alpha=k\delta$ (k is a wavevector of the under-test pulse) between the noise spatiotemporal slope $\alpha$ and pulse spatial-spectrum coupling coefficient $\delta$ at the location of each optical element, the origin of each group of noise is identified. By calculating corresponding $\delta$ of all the optical elements in the pulse stretcher 18 and the pulse compressor 19, the origins of the noises numbered from ① to ⑤ are identified, wherein ① stems from the beams 26 and 27 on the concave mirror 22, ② stems from the stretcher grating 21 and the stretcher vertical roof mirror 24, ③ stems from the horizontal roof mirror 30, ④ stems from the compressor grating 29 and the compressor vertical roof mirror 31, and ⑤ stems from the beams 25 and 28 on the concave mirror 22.

Figure 6:
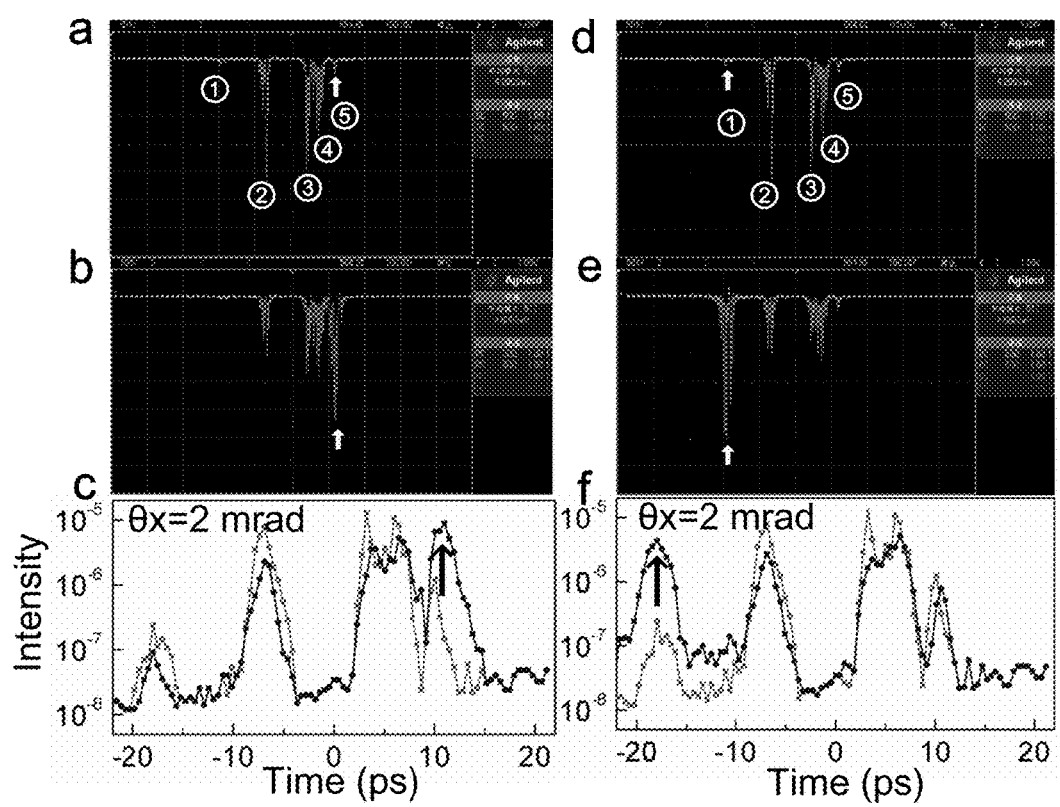
FIG. 6 shows results of a method for identifying noise origins according to the preferred embodiment of the present invention.

An online identification method for the noise origins of the device is illustrated as follows. Referring to FIG. 6, the fiber array 9 is fixed at $\theta_x$=2 mrad and five signal peaks (① to ⑤) are displayed on the digital oscilloscope 14 (FIGS. 6a and d), respectively corresponding to the five signal peaks in FIG. 6 measured at $\theta_x$=2 mrad. The digital oscilloscope 14 indicates that, when a lens tissue is provided to interfere the beam 25, a signal peak at the most right hand on the oscilloscope 14 increases suddenly (FIG. 6b) by an order of magnitude (FIG. 6c) according to data processing, which proves that the signal peak at the most right hand stems from the beam-25-located optical surface. In the same way, by providing the lens tissue to interfere the beam 26, the signal peak at the most left hand on the oscilloscope 14 increases suddenly (FIG. 6e) by an order of magnitude (FIG. 60 according to data processing, which indicates that the signal peak at the most left hand stems from the beam-26-located optical surface. The online identification method of the device facilitates checking all the optical surfaces of the pulse stretcher 18 and the pulse compressor 19, with saved time and effort.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A spatiotemporally resolved far-field pulse contrast measuring method, comprising steps of:

(1) focusing an under-test beam in x dimension to make a focus of the under-test beam fall onto a front surface of a nonlinear correlation crystal;

(2) making a spatial correlation and a temporal correlation respectively in two transverse spatial dimensions (x y) of the nonlinear correlation crystal by the far-field under-test beam and a sampling beam, so as to generate a two-dimensional correlating signal;

(3) imaging the two-dimensional correlating signal onto a detection surface of a receiver system; and (4) detecting the two-dimensional correlating signal by the receiver system in a high sensitivity, and obtaining a spatiotemporal distribution of an under-test pulse contrast; wherein:

the x dimension is a spatial dimension where noise has a spatiotemporal-coupling characterization; the x dimension is one of the two spatial dimensions when the noise has the spatiotemporal-coupling characterization in two spatial dimensions; and the under-test beam is focused in the y dimension to measure the far-field spatial distribution of noise in the y dimension.

2. The method, as recited in claim 1, wherein the sampling beam on the surface of the nonlinear correlation crystal is shaped as a large spot or a focal spot; when the sampling beam is shaped as a focal spot, the sampling beam has the same focusing direction with the under-test beam.

3. The method, as recited in claim 1, wherein the under-test beam and the sampling beam make a non-collinear cross-correlation in the y dimension to realize a single-shot temporal measurement; and, the under-test beam and the sampling beam make the spatial correlation in the x dimension in a single-shot mode or a scanning mode according to the sampling beam shaped as a large spot or a focused spot on the surface of the nonlinear correlation crystal.

4. A far-field pulse contrast single-shot measuring device of the method; as recited in claim 1, comprising: a plano-convex cylindrical lens (3), a correlation crystal (4), a plano-convex imaging lens (8) and a signal-receiving system, wherein the signal-receiving system comprises a fiber array (9), a photomultiplier (13) and a digital oscilloscope (14); the fiber array (9) comprises N fiber-channels (10), attenuators (11) on each fiber channel (10) and a fiber bundle (12); a length of each fiber channel (10) between the fiber array (9) and the fiber bundle (12) increases successively from side to side with an incremental length of L meters; the correlation crystal (4) is located both at a focal plane of the plano-convex cylindrical lens (3) and an object plane of the plano-convex imaging lens (8); the fiber array (9) is located at an image plane of the plano-convex imaging lens (8); a line array of the fiber channels (10) is parallel with a focal line of the plano-convex imaging lens (3); wherein an output end of the photomultiplier (13) is connected with an input end of the digital oscilloscope (14).

5. The device, as recited in claim 4, wherein the fibers are communication fibers or ultraviolet fibers according to signal wavelength; the fiber array (9) is fixed on a holder which is translational in the x dimension; the incremental length L of the fiber channels (10) is 1-2 meters and the number N of the fiber channels (10) is 50-200.

6. The device, as recited in claim 4, wherein the fiber array (9) translates the received y-dimensional correlating signal (7) into a serial temporal pulse sequence, which is received and analyzed by the photomultiplier (13) and the oscilloscope (14).

7. An online identification method for origins of spatiotemporal noise of the device as recited in claim 4, comprising steps of: when the fiber array (9) is located at a certain spatial position, displaying an image by the digital oscilloscope (14); placing a lens tissue in front of an optical surface to interfere a laser beam on the optical surface, and displaying by the digital oscilloscope (14) that a signal peak is typically enhanced, wherein the enhanced signal peak is just induced by optical surface.

* * * * *